(12) United States Patent
Barry (10) Patent No.: US 7,418,434 B2
(45) Date of Patent: Aug. 26, 2008

(54) FORWARD-CHAINING INFERENCING

(75) Inventor: Andrew Barry, Barton (AU)

(73) Assignee: Ruleburst Limited, Barton (AU)

( * ) Notice: Subject to any disclaimer, the term of this patent is extended or adjusted under 35 U.S.C. 154(b) by 424 days.

(21) Appl. No.: 10/908,495

(22) Filed: May 13, 2005

(65) Prior Publication Data

US 2005/0240546 A1  Oct. 27, 2005

Related U.S. Application Data

(63) Continuation-in-part of application No. PCT/AU03/01524, filed on Nov. 13, 2003.

(30) Foreign Application Priority Data

Nov. 14, 2002 (AU) ............................... 2002952648

(51) Int. Cl.
G06F 17/00 (2006.01)
G06N 5/02 (2006.01)
(52) U.S. Cl. ...................................................... 706/47
(58) Field of Classification Search .................... 706/47
See application file for complete search history.

(56) References Cited

U.S. PATENT DOCUMENTS

| | | | | |
|---|---|---|---|---|
| 4,884,217 A * | 11/1989 | Skeirik et al. | ................. | 706/56 |
| 4,907,167 A * | 3/1990 | Skeirik | ......................... | 700/10 |
| 4,910,691 A * | 3/1990 | Skeirik | ......................... | 706/45 |
| 4,920,499 A * | 4/1990 | Skeirik | ......................... | 706/11 |
| 4,937,760 A * | 6/1990 | Beitel et al. | .................... | 706/53 |
| 4,965,742 A * | 10/1990 | Skeirik | ........................ | 700/86 |
| 4,975,865 A * | 12/1990 | Carrette et al. | ................ | 700/10 |
| 5,006,992 A * | 4/1991 | Skeirik | ......................... | 706/58 |
| 5,140,671 A * | 8/1992 | Hayes et al. | ................... | 706/60 |
| 5,167,012 A * | 11/1992 | Hayes et al. | ................... | 706/60 |
| 5,170,464 A * | 12/1992 | Hayes et al. | ................... | 706/60 |
| 5,230,061 A * | 7/1993 | Welch | .......................... | 706/46 |
| 5,412,756 A * | 5/1995 | Bauman et al. | ................ | 706/45 |

(Continued)

OTHER PUBLICATIONS

The model-assisted global query system for multiple databases in distributed enterprises, Waiman Cheung; Cheng Hsu; ACM Transactions on Information Systems (TOIS), vol. 14, Issue 4 (Oct. 1996), pp. 421-470 Year of Publication: 1996 ISSN:1046-8188.*

(Continued)

Primary Examiner—Michael B Holmes
(74) Attorney, Agent, or Firm—Choate Hall & Stewart, LLP (57) ABSTRACT

A method is disclosed of forward-chaining inferencing in a rulebased system having a rulebase and a set of input facts, wherein new facts are inferred in accordance with variations to the rules or the input facts, the method including:

developing a computerized database containing a fact dependency tree for indicating which facts are used to produce other facts in accordance with respective rules in the rulebase;

sequentially ordering the facts in the fact dependency tree to produce a serialized fact dependency tree wherein for any given fact in the sequence, all facts which are used to produce that fact are facts which are earlier in the sequence than is the given fact, and ordering the rules in the rulebase in accordance with the facts produced thereby to produce a serialized rulebase wherein the rules are in the same sequential order as the facts in the serialized fact dependency tree.

11 Claims, 9 Drawing Sheets

U.S. PATENT DOCUMENTS

| | | | | |
|---|---|---|---|---|
| 5,701,400 | A * | 12/1997 | Amado | 706/45 |
| 5,778,150 | A * | 7/1998 | Chan et al. | 706/46 |
| 5,980,096 | A * | 11/1999 | Thalhammer-Reyero | 707/100 |
| 6,003,020 | A * | 12/1999 | Hazlehurst et al. | 706/11 |
| 6,125,363 | A * | 9/2000 | Buzzeo et al. | 707/100 |
| 6,144,953 | A * | 11/2000 | Sorrells et al. | 706/60 |
| 6,298,327 | B1 * | 10/2001 | Hunter et al. | 705/1 |
| 6,570,555 | B1 * | 5/2003 | Prevost et al. | 345/156 |
| 7,124,134 | B2 * | 10/2006 | Buzzeo et al. | 707/10 |
| 7,191,163 | B2 * | 3/2007 | Herrera et al. | 706/47 |

OTHER PUBLICATIONS

Rule responder: RuleML-based agents for distributed collaboration on the pragmatic web, Adrian Paschke; Harold Boley; Alexander Kozlenkov; Benjamin Craig; ACM International Conference Proceeding Series; vol. 280 Proceedings of the 2nd intl conf on Pragmatic web, pp. 17-28; 2007 ISBN:978-1-59593-859-6.*

Jena: implementing the semantic web recommendations, Jeremy J. Carrol; Ian Dickinson; Chris Dollin; Dave Reynolds; Andy Seaborne; Kevin Wilkinson; ACM Proceedings of the 13th international World Wide Web conference on Alternate track papers & posters, New York, NY, 2004, pp. 74-83, ISBN:1-58113-912-8.*

* cited by examiner

*FIG 1 — PRIOR ART*
*Rete network*

FIG 2 — PRIOR ART
Rete network when f1 = true

FIG 3 - PRIOR ART
Rete network when f1 = true, f2 = true

FIG 4 - PRIOR ART
Rete network when f1 = true, f2 = true, f6 = false

FIG 5
Fact dependency tree

FIG 6
*Serialised fact dependency tree*

FIG 7
*Serialised rulebase*

FIG 10
*Fact dependency loop*

FIG 11
*Serialised fact dependency tree with a snarl*

FIG 12
*Serialised rulebase with snarl*

FIG 13
*Related objects with attributes*

| parent: | George |
|---|---|
| f1: | male |

| child: | Julie | Barney |
|---|---|---|
| f2: | female | male |
| f3: | true | false |

| friend: | Fred | Geri |
|---|---|---|
| f4: | male | female |
| f5: | true | false |

*FIG 14*
*Tables that store object instance data*

FORWARD-CHAINING INFERENCING

CROSS REFERENCE TO RELATED APPLICATIONS

This application is a continuation-in-part of International Patent Application No. PCT/AU2003/001524, filed Nov. 13, 2003, which claims priority to Australian Patent Application No. 2002952648, filed Nov. 14, 2002.

TECHNICAL FIELD

This invention relates to systems for and methods of forward-chaining inferencing.

Forward-chaining inferencing can be described as a process or method by which new facts are discovered given a rulebase (i.e. a set of rules) and a set of input facts. It is used by and in so-called expert systems which can be described as computers or computer programs that use symbolic knowledge and inference to reach conclusions.

By way of example, an expert system could apply a set of input facts describing an individual's personal circumstances to a rulebase that models a national Social Security Act or the like to determine the social security benefits to which the individual is entitled.

This process is referred to as forward-chaining because it is essentially a chain of inferences that start from the input facts and end with the required determinations.

The invention has particular but not exclusive application to the use of forward-chaining inferencing in expert systems and for illustrative purposes reference will be made throughout this specification to such use. However it will be realized the present invention may be utilized in other applications where computers are used to infer outcomes (or new facts) from a set of given inputs (or facts) in accordance with a set of rules (i.e. a number of operational or governing criteria).

BACKGROUND OF THE INVENTION

Expert systems are well known. They have been described as follows:

Expert System

A computer program that uses symbolic knowledge and inference to reach conclusions. It derives most of its power from its knowledge. The key components of an expert system are an inference engine and a knowledge base. The separation of control (the inference engine) from knowledge (knowledge base) is a hallmark of an expert system. Other components of an expert system include a user interface, a knowledge-acquisition module, and an explanatory interface.

An expert system derives most of its power from its knowledge rather than its inferencing ability. Expert systems are applied to the class of problems in which no simple algorithmic solution is known. To qualify as an expert system it must attain levels of performance roughly equivalent to a human expert. Most expert systems are able to explain their reasoning. Expert systems are generally able to reason about their own inference processes. Other advantages of expert systems are that they do not forget, they consider all details, they don't overlook remote possibilities and they do not jump to conclusions.

In contrast with ordinary computer programs, expert systems can be incrementally modified with little difficulty—at least as compared to conventional programs. The knowledge in an expert system is more available to scrutiny than it is in a conventional program where knowledge may be intertwined with procedure . . . Expert systems are more robust than conventional programs—they are more likely to be able to handle unexpected situations.

There are a number of criteria for the use of expert systems: One is the existence of expertise in the area. The task should be a complex problem with multiple interacting subtasks where there appears to be no fixed order of problem solution. It is useful when the solution needs to be explained, when what—if analysis is desirable, or when it is known that the system will be frequently revised.

Mercadal, D. 1990. Dictionary of Artificial Intelligence. p 96-97. NY: Van Nostrand Reinhold It should be noted the term rulebase as used herein is synonymous with the expression knowledge base above.

The standard method used by expert systems for forward-chaining inferencing is known as the Rete algorithm and aims to minimize the amount of effort required for an inference cycle whenever input facts change. The Rete algorithm will be explained in more detail when describing the preferred embodiment of present invention.

The Rete algorithm was invented in 1979—a bygone era of computing. Since then, the application of expert systems, including the environment that they work within, has changed dramatically:

Systems must now provide high levels of scalability to support thousands of concurrent users, particularly through the use of stateless application development;

Today's Internet technologies mean that systems are largely transactional by nature;

Modern user interfaces are better at collecting many items of data per screen (or transaction);

Today's processors are much faster with large onboard caches.

Expert systems that perform batch processing and provide engine-based services are now a common requirement;

Integration of expert systems with corporate databases is a standard requirement.

The forward-chaining inferencing system and method of the present invention allows expert systems to better deal with these significant changes.

BRIEF SUMMARY OF THE INVENTION

The present invention aims to provide an alternative to known systems and methods of forward-chaining inferencing.

This invention in one aspect resides broadly in a method of forward-chaining inferencing in a rulebased system having a rulebase and a set of input facts, wherein new facts are inferred in accordance with variations to the rules or the input facts, the method including:

developing a computerized database containing a fact dependency tree for indicating which facts are used to produce other facts in accordance with respective rules in the rulebase;

sequentially ordering the facts in the fact dependency tree to produce a serialized fact dependency tree wherein for any given fact in the sequence, all facts which are used to produce that fact are facts which are earlier in the sequence than is the given fact, and ordering the rules in the rulebase in accordance with the facts produced thereby to produce a serialized rulebase wherein the rules are in the same sequential order as the facts in the serialized fact dependency tree.

As used herein the expression "rulebase" is to be given a broad meaning. Rulebased systems and methods are ones which are developed and implemented, and which operate, in accordance with a set of rules. The rules are preferably declarative, i.e. they explain rather than pronounce.

It is preferred that the method also includes:

setting in working memory all known input facts;

sequentially evaluating each of the ordered rules in the rulebase, and updating the working memory in accordance with any changes to the facts in accordance with the evaluating of a rule.

In another aspect this invention resides broadly in a system for forward-chaining inferencing in a rulebased system having a rulebase and a set of input facts, wherein new facts are inferred in accordance with variations to the rules or the input facts, the system including:

a computerized database containing a fact dependency tree for indicating which facts are used to produce other facts in accordance with respective rules in the rulebase, and computer program code instructions which configure the system to sequentially order the facts in the fact dependency tree to produce a serialized fact dependency tree wherein for any given fact in the sequence, all facts which are used to produce that fact are facts which are earlier in the sequence than is the given fact, and to order the rules in the rulebase in accordance with the facts produced thereby to produce a serialized rulebase wherein the rules are in the same sequential order as the facts they produce in the serialized fact dependency tree.

It is further preferred that the computer program code instructions configure the system to:

set in working memory all known input facts;

sequentially evaluate each of the ordered rules in the rulebase, and update the working memory in accordance with any changes to the facts in accordance with the evaluating of a rule.

It is preferred that the development of the computerized database containing a fact dependency tree includes:

generating a graph in which each of the facts relevant to the set of rules in the rulebase is identified without any indication of the sequential relationship of the facts, and for each rule in the rulebase, providing an arc between the facts associated with that rule, the linkage being directed from the fact(s) which produce other fact(s) toward the other fact(s).

As used herein the expression "graph" refers to a graphical illustration of the facts in a rulebase, for example a set of nodes each representing a fact can be referred to as a graph. As used herein the expression "arc" in relation to graphs refers to a connecting one-way arrow which joins two facts, for example a directional linkage between nodes/facts can be referred to as an arc.

It is also preferred that only those rules which are relevant in a given situation are evaluated whereby the new facts are inferred incrementally. Accordingly, the method may include:

maintaining a lookup table for recording for each fact in the rulebase which rules are reliant thereon for evaluation, and maintaining a flag for each rule in the rulebase, the flag indicating for any given fact or setting of a fact value between or during inferences, whether the rule is relevant or irrelevant.

The method and system of forward-chaining inferencing may also take into account cyclic rule dependencies. Accordingly the method may include:

identifying loops in the fact dependency tree, the loops being generated by cyclically dependant rules;

for each said loop, identifying a snarl containing the loop;

for each said snarl, ignoring the facts in the snarl and any fact dependencies within the snarl and treating the snarl as an indivisible node, when sequentially ordering the facts in the fact dependency tree, and marking the start and end of each snarl in the serialized rulebase.

As used herein the expression "snarl" refers to the smallest set of facts in the fact dependency tree which contains a loop or loops generated by cyclically dependent rules.

In this embodiment it is also preferred that the method includes, when inferencing:

repeatedly evaluating the rules in each snarl in cycles, and stopping evaluating the rules in a snarl when a steady state is reached.

The method and system of forward-chaining inferencing may also take multiple object instances into account. In this embodiment facts representing attributes of object instances are stored in working memory object instance tables for storing multiple sets of facts, and the rules proving these facts are evaluated once for each object instance, the sequential evaluation order of the rules being preserved.

As used herein the expression "object instance" refers to a specific instance of a real-world entity and the expression "attribute" refers to a quality associated with an object instance. Thus by way of non-limiting example, a child called Julie is an object instance, as is a second child called Barney—and object instances of the same type, (e.g. Julie and Barney), have the same type of attributes, (e.g. their sex).

The method and system of forward-chaining inferencing may also accommodate batch processing. Accordingly the steps of sequentially evaluating the ordered rules and updating the working memory can be conducted simultaneously across multiple working memories to facilitate batch processing for enhancing the average level of system performance.

BRIEF DESCRIPTION OF THE DRAWINGS

In order that this invention may be more easily understood and put into practical effect, reference will now be made to the accompanying drawings which illustrate a preferred embodiment of the invention, wherein.

DETAILED DESCRIPTION OF THE INVENTION

By way of illustrative example of forward-chaining inferencing and to enable a better understanding of the methodology of the present invention a simplified rulebase will be outlined by way of example and this rulebase used to exemplify forward-chaining inferencing, first with reference to the known Rete algorithm, and second with reference to the system and method of the present invention.

Let it be assumed by way of example that there are 10 facts: f1, f2, . . . , f10. Facts f1 to f6 are input facts, i.e. they are provided to the rulebase. Facts f7 to f10 are inferred by the rulebase. All the facts take Boolean logical values.

The rulebase consists of 6 rules, r1 to r6:
r1: f1+f2+f5→f10
r2: f7+f10→f9
r3: f4→f10
r4: f6+f1→f8
r5: f3+f8→f9
r6: f1+f2→f7

For the purposes of this specification the specific method of evaluating the rules is not relevant. The + operator is some combining operator and the→means "produces", e.g. according to r1, if we have values for f1, f2 and f5 then they can be combined to produce a value for f10.

However, to better assist with an understanding of the examples to follow, it is assumed that the + operator performs a logical AND, i.e. a+b produces:
true, if both a and b are true; or
false, if either a or b is false; or
unknown, otherwise.
Now, given the following input facts:
f1 is true;
f2 is true;
f6 is false; and
all other input facts are unknown,
an expert system uses forward-chaining inferencing to determine that:
f7 is true (by applying r6);
f8 is false (by applying r4);
f9 is false (by applying r4 and r5); and
f10 is unknown.

As indicated above, the Rete algorithm is the industry standard for forward-chaining inferencing and aims to minimize the amount of effort required for an inference cycle whenever input facts change. It relies on the following basic assumptions:
working memory generally changes slowly; and
the left-hand side of the rules in a rulebase contain many similar expressions.

The Rete algorithm is implemented using a tree-based network, where the nodes of the tree are either:
leaves, representing the input facts;
combining operators that take two values and combine them to product a result; or
inferred facts.

The network also contains the working memory: between inferences, fact nodes store their values and combining operators store their inputs.

Figure 1:
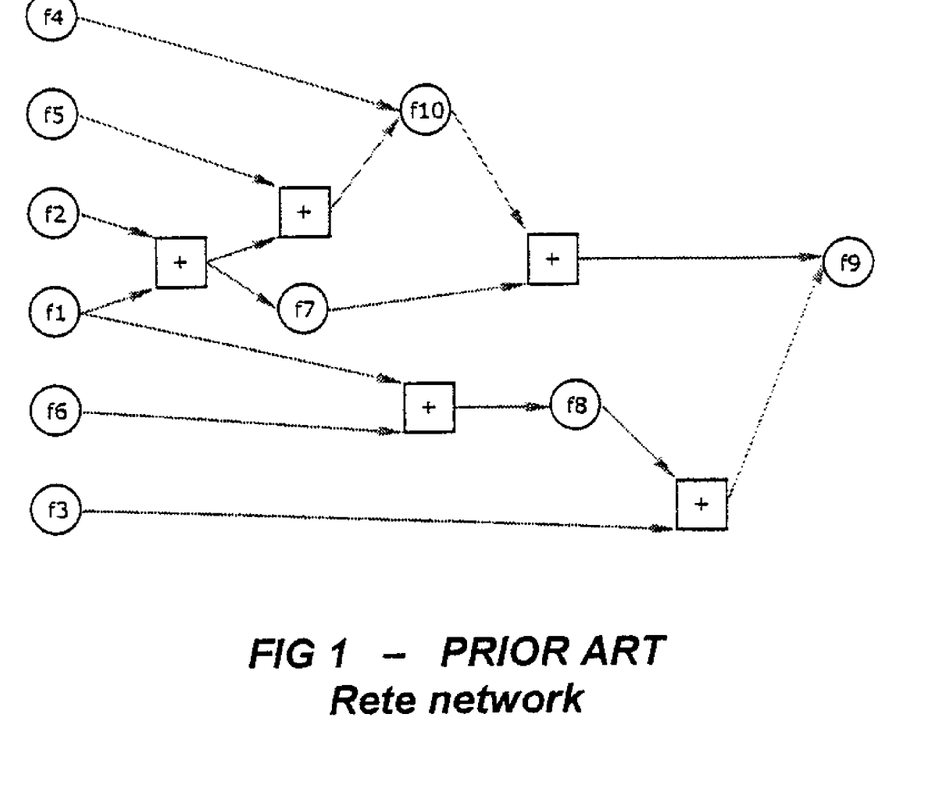
FIGS. 1 to 4 illustrate exemplary networks in accordance with forward-chaining inferencing by the known method utilizing the Rete algorithm.

The network for the rulebase exemplified above is illustrated in FIG. 1. Arcs (represented by arrows in the illustration) are located between nodes (represented in the illustration as either small circles indicating a fact, or small squares indicating a combining operator). The arcs between the nodes are used to propagate values through the network during inferencing.

It should be noted that the evaluation of f1+f2 is used twice in the network (to evaluate f7 using r6 and to evaluate f10 using r1). This is how the algorithm deals with repeated patterns in the left hand side of rules, in accordance with the 2nd of the algorithm's assumptions.

The leaf nodes, f1 to f6 in FIG. 1 are the inputs of the network. When an input fact changes, the value is fed into the network via the node's output arcs. When a value flows into an inferred fact node it is stored by that node and then emitted through its output arcs (if any). When a value flows into a combining operator it is stored by the combining operator as an input. The combined value is then emitted through the node's output arcs.

Implementing a data structure to represent the Rete network is relatively straightforward. The inferencing process itself can be described as walking the paths from the input fact that has changed value (e.g. f5 in FIG. 1) until the paths come to an end (e.g. by hitting f9) or until a combining operator is hit which does not emit a new value.

Figure 2:
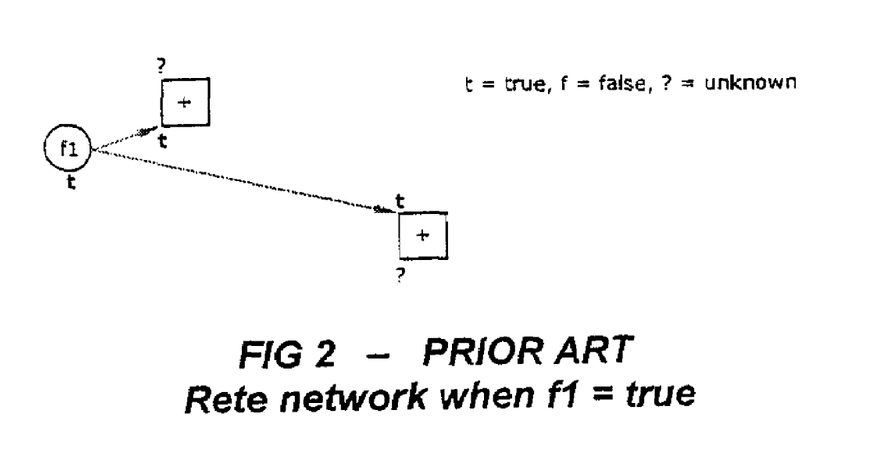
Figure 3:
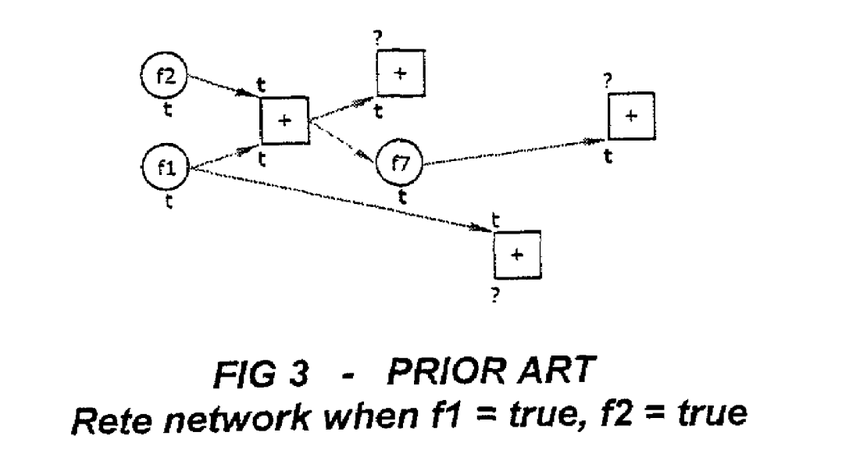
Figure 4:
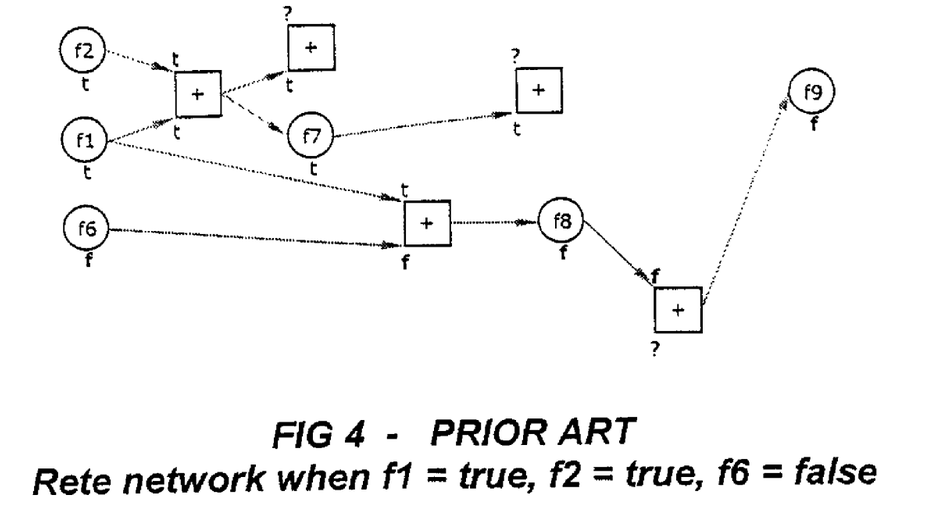

FIG. 2 illustrates the relevant part of the example network after setting f1 to true and performing the subsequent inference. FIG. 3 illustrates the relevant part of the example network after setting f2 to true and performing the subsequent inference, and FIG. 4 illustrates the relevant part of the example network after setting f6 to false and performing the subsequent inference.

The Rete algorithm thus always traverses the relevant part of a rulebase whenever a fact value is changed. By way of contrast the method and system of the present invention serializes the inferencing process. This present system and method of forward-chaining inferencing has been termed linear inferencing and that expression will be used throughout the specification to refer to the system and method of the present invention.

Figure 5:
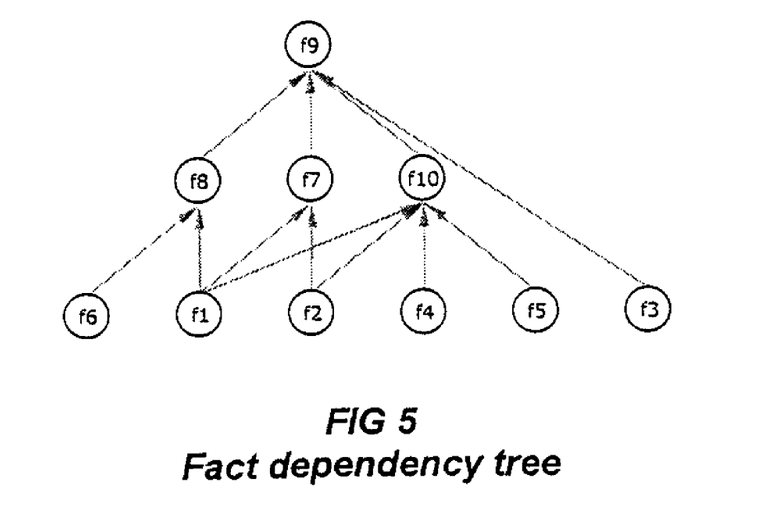
FIG. 5 illustrates a fact dependency tree in accordance with the linear inferencing process of the present invention.

The first step in preparing a rulebase for Linear inferencing is to build a fact dependency tree showing which facts are used to produce other facts. The fact dependency tree for the exemplified rulebase is shown in FIG. 5.

Figure 6:
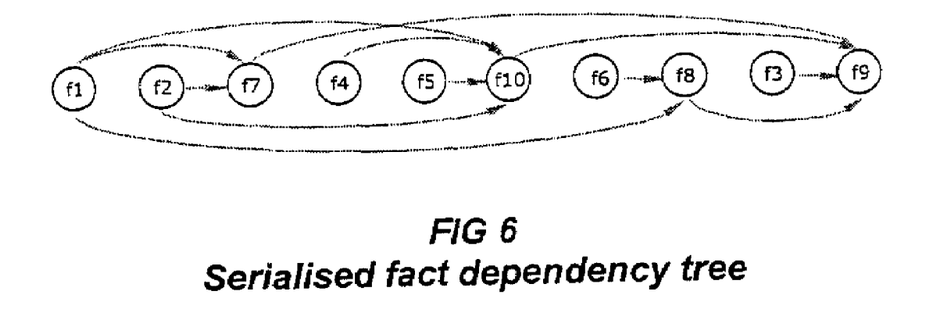
FIG. 6 illustrates a serialized fact dependency tree in accordance with the linear inferencing process of the present invention.

The next step is to lay out the facts serially while ensuring that all the arcs point to the right. This is always possible for a rulebase, providing the rulebase contains no cyclic dependencies. (The approach to be adopted when there are cyclic dependencies is described subsequently). A serialized dependency tree for the exemplified rulebase is shown in FIG. 6.

The final step is to build a data structure containing the rules laid out serially in a contiguous block of memory. The rules are ordered by the facts they produce, in accordance with the serialized fact dependency tree.

Figure 7:
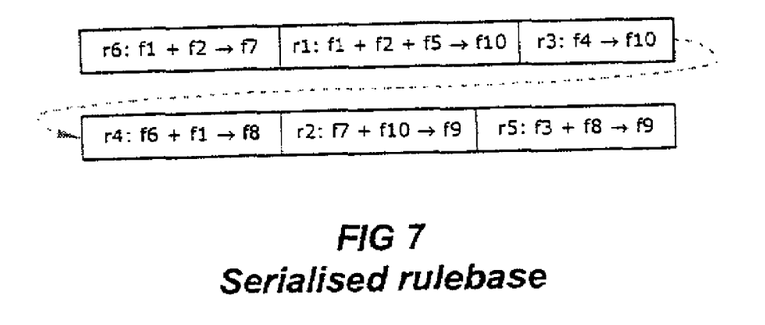
FIG. 7 illustrates a serialized rulebase in accordance with the linear inferencing process of the present invention.

Using the exemplified rulebase above, the process starts with all the rules that produce f1, then the rules that produce f2, then the rules that produce f7, then the rules that produce f4, etc. The serialized rulebase for the above example is illustrated in FIG. 7.

This serializing of the rulebase by the ordering of the rules allows inferencing to occur with a single left-to-right scan of the rulebase and guarantees that inferred facts needed to evaluate a specific rule are always produced before that rule.

A working memory is utilized consisting of an array of fact values, initialized with any known values for the input facts. For the example above, initial working memory is:

| f1 | f2 | f3 | f4 | f5 | f6 | f7 | f8 | f9 | f10 |
|----|----|----|----|----|----|----|----|----|-----|
| t  | t  | ?  | ?  | ?  | f  | ?  | ?  | ?  | ?   | t = true,
f = false,
? = unknown

Performing an inference begins with the first rule in the serialized rulebase. In our example this s r6, which produces a value for f7:

| f1 | f2 | f3 | f4 | f5 | f6 | f7 | f8 | f9 | f10 |
|----|----|----|----|----|----|----|----|----|----|
| t  | t  | ?  | ?  | ?  | f  | t  | ?  | ?  | ?  |

The inference then continues to the next rule. In our example this is r1, which fails to produce a value for f10 because f5 is unknown, so working memory remains unchanged.

The inference continues in this fashion until all the rules have been evaluated. In our example, working memory will finally be:

| f1 | f2 | f3 | f4 | f5 | f6 | f7 | f8 | f9 | f10 |
|----|----|----|----|----|----|----|----|----|----|
| t  | t  | ?  | ?  | ?  | f  | t  | f  | f  | ?  |

When one or more input facts subsequently change value, another inference is required to update working memory.

Figure 8:
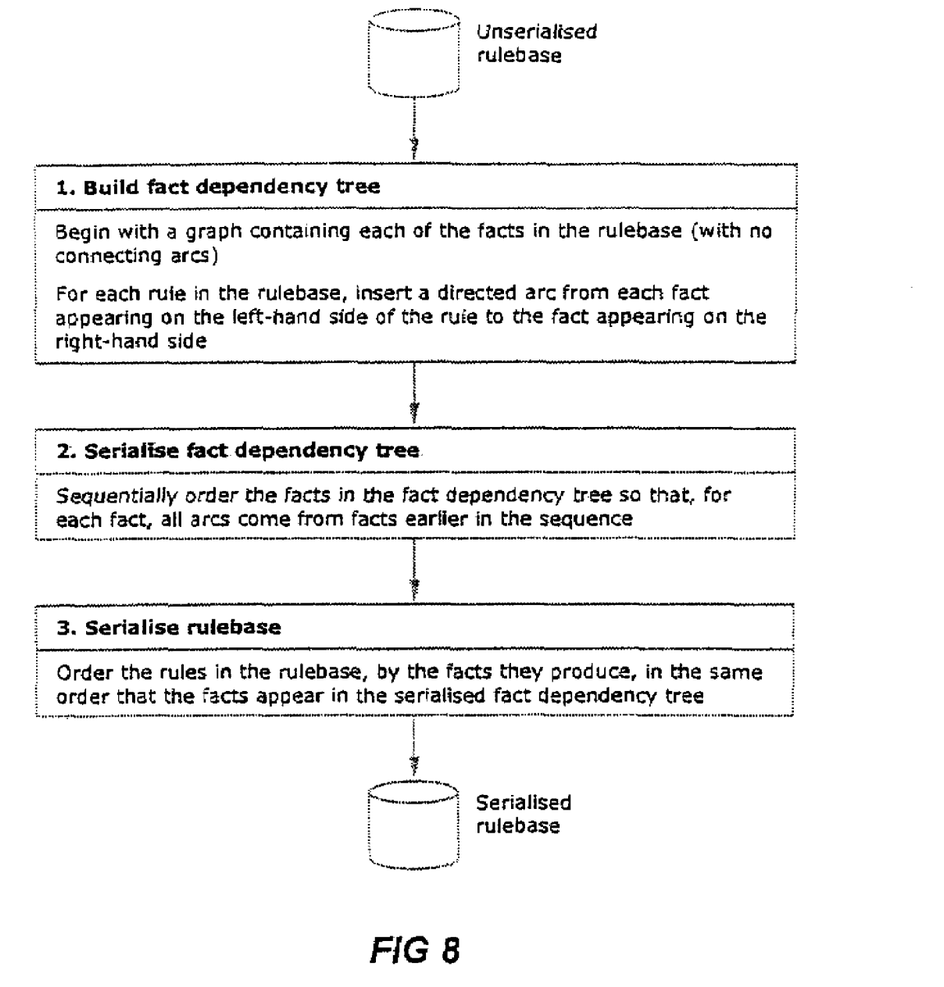
FIG. 8 is a schematic block diagram of the linear inferencing process of the present invention.

Reference is now made to FIG. 8 which is a stylistic block diagram illustrating the main aspects of linear inferencing, i.e. building a fact dependency tree, serializing the fact dependency tree and serializing the rulebase.

To build the fact dependency tree the method begins with a graph containing each of the facts in the rulebase but without any connecting arcs. For each rule in the rulebase, a directed arc is then inserted from each fact appearing on the left-hand side of the rule to the fact appearing on the right-hand side. The facts in the fact dependency tree are then sequentially ordered so that for each fact, all arcs will come from facts positioned earlier in the sequence. The fact dependency tree has now been serialized. Finally, the rules in the rulebase are ordered by the facts they produce into the same order as the facts appear in the serialized fact dependency tree. This serializes the rulebase.

Figure 9:
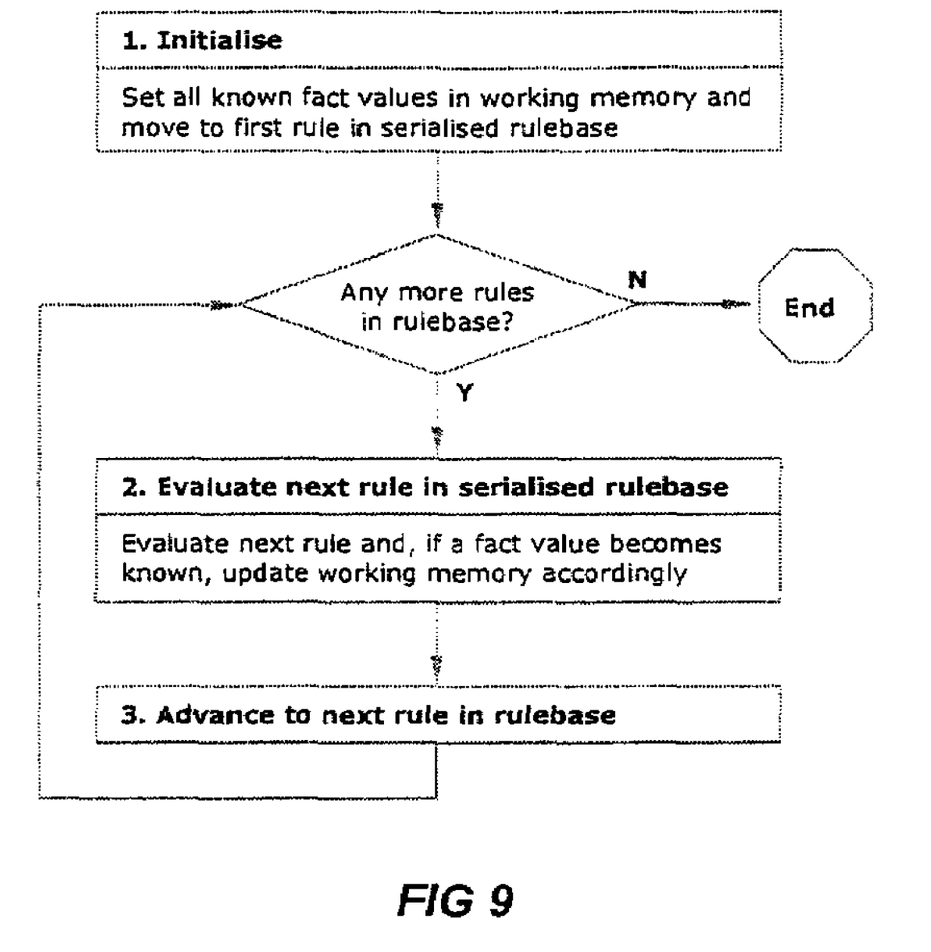
FIG. 9 is a flowchart illustrating the linear inferencing process of the present invention.

A flow chart diagram illustrating the linear inferencing process is seen in FIG. 9.

A number of enhancements to the basic Linear inferencing approach will now be described.

Incremental Inferencing

The Linear inferencing algorithm can be easily extended to provide a mechanism for implementing incremental inferencing. The basic approach is to evaluate only those rules that are relevant, when inferencing, by tracking fact dependencies as follows:

1. Maintain a flag for each rule in the rulebase that specifies whether the rule is relevant or irrelevant. Initially, all rules are marked irrelevant.
2. Maintain a lookup table that records, for each fact in the rulebase, which rules are reliant on that fact for evaluation, i.e. which rules have that fact appearing on the left-hand side. For our standard example, the lookup table for incremental inferencing is as follows:

| f1 | f2 | f3 | f4 | f5 | f6 | f7 | f8 | f9 | f10 |
|----|----|----|----|----|----|----|----|----|----|
| r1 | r1 | r5 | r3 | r1 | r4 | r2 | r5 | —  | r2 |
| r4 | r6 |    |    |    |    |    |    |    |    |
| r6 |    |    |    |    |    |    |    |    |    |

3. Whenever a fact value is set (between or during inferences), the lookup table is used to mark each dependent rule as relevant. For our standard example, the initial state of the relevancy flags immediately after working memory has been initialized, is as follows:

| r1 | r2 | r3 | r4 | r5 | r6 |
|----|----|----|----|----|----|
| r  | i  | i  | r  | i  | r  | i = irrelevant,
r = relevant

4. Inferencing proceeds as described earlier except that any irrelevant rules are skipped over. When a fact is set during an inference, any dependent rules of that fact are also marked as relevant. It is noted that these newly dependent rules will always appear to the right of the current rule in the serialized rulebase, maintaining the linearity of the inferencing process.

Cyclic Dependencies

Cyclic dependencies generate loops in a rulebase because of rules such as:

1. If the person is male then they are not female
2. If the person is female then they are not male Such rules, although prima facie superfluous, are often required in an expert system.

Extending the above exemplified rule format slightly, such rules can be represented as follows:

r7: f10→f11=false
r8: f11→f10=false, where f10 represents "the person is male" and f11 represents "the person is female".

Figure 10:
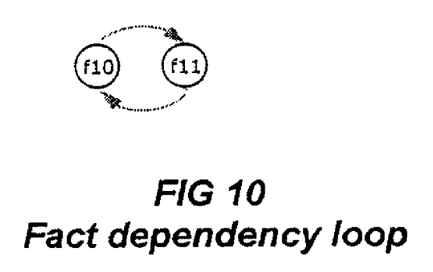
FIGS. 10 to 12 relate to the treatment of cyclic dependencies with FIG. 10 illustrating a fact dependency loop, FIG. 11 illustrating a serialized fact dependency tree with a snarl, and FIG. 12 illustrating a serialized rulebase with a snarl, and FIGS. 13 and 14 relate to the treatment of multiple object instances with FIG. 13 illustrating an example of related objects and their attributes and FIG. 14 illustrating tables which store object instance data.

Such cyclic dependencies thwart the establishment of a perfectly serialized fact dependency tree and hence, of a perfectly serialized rulebase. This is because, in terms of the above example, facts cannot be ordered so that all the arcs point to the right as seen in FIG. 10.

Figure 11:
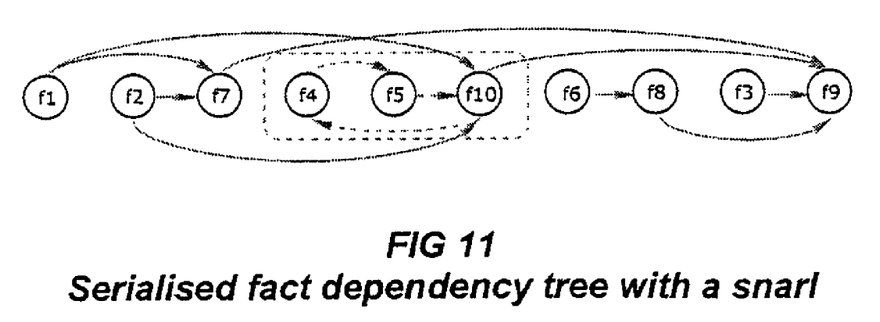
Figure 12:
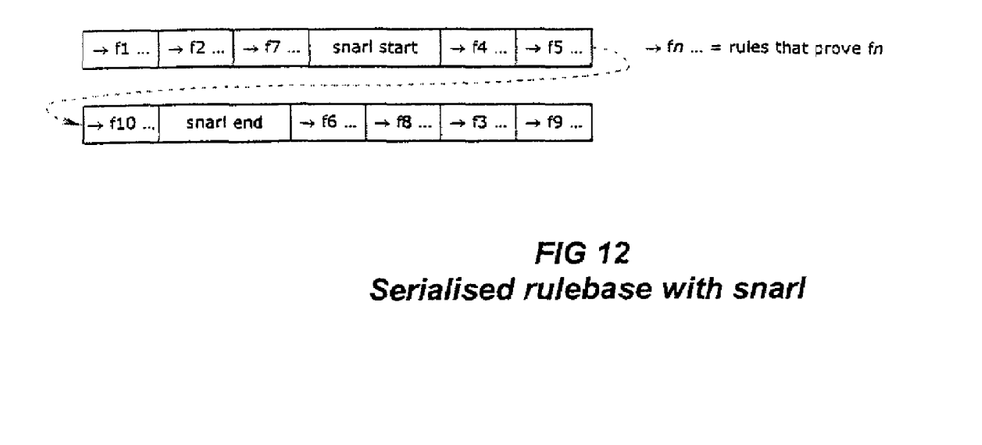

These cyclic dependency loops can be dealt with as follows:

1. For each loop in the fact dependency tree, identify the smallest set of facts that contain such a loop. These sets of facts are herein termed snarls.
2. Treat each snarl as an indivisible node, when serializing the fact dependency tree, ignoring the individual facts and any dependencies within the snarl itself. The internal order of facts within snarls also no longer matters. An example of this is seen in FIG. 11 which illustrates a serialized fact dependency tree with a snarl. For the tree in FIG. 11, the {f4, f5, f10} snarl is dependent on f1 and f2, with only f9 dependent on the snarl itself.
3. The serialized rulebase is then created from the serialized fact dependency tree as normal. The start and end of the group of rules that represent each snarl are also recorded for future reference during inferencing as seen in FIG. 12 which illustrates a serialized rulebase with a snarl.
4. When inferencing, the normal process is followed until a snarl is encountered. At this point, what may be termed a "brute-force" approach to inferencing is used, wherein the rules in a snarl are repeatedly evaluated in cycles, until a steady-state in working memory is reached (or until some sort other terminating mechanism kicks in). In practice, the number of rules in each snarl is very small, making the brute force approach ideal.

Multiple Object Instances

Figure 13:
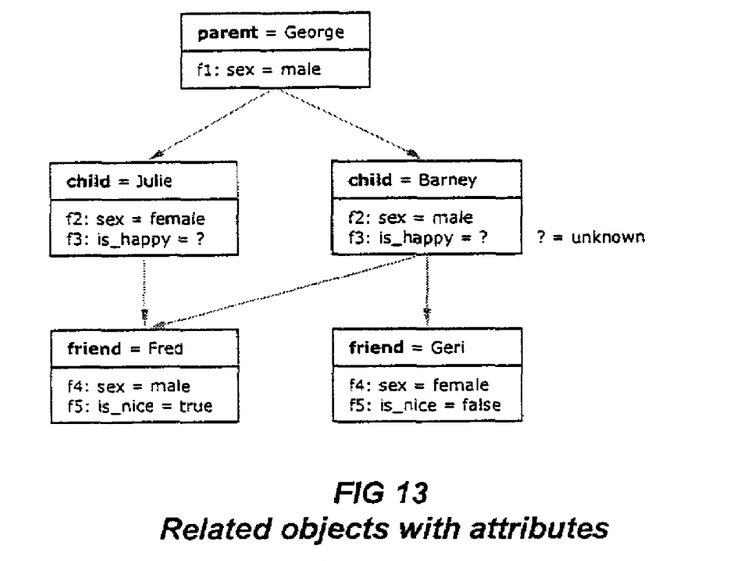

Modern expert systems need to be able to reason about real-world objects having rich interrelationships, such as illustrated in FIG. 13 which illustrates related objects and their attributes.

In an extension of the present invention, object attributes such as "is_nice" are regarded as actual facts (f5 in the example of FIG. 13). This means that facts can take on multiple values, one for each associated object instance (so f5 is true for Fred but false for Geri in the example of FIG. 13).

The system provides for the development of rules that infer facts across object instances simultaneously. For example, rules such as:

r1: all a child's friends are nice →the child is happy
r2: any of a child's friends are not nice →the child is not happy, would produce the value of true for julie's f3 and false for Barney's f3.

Figure 14:
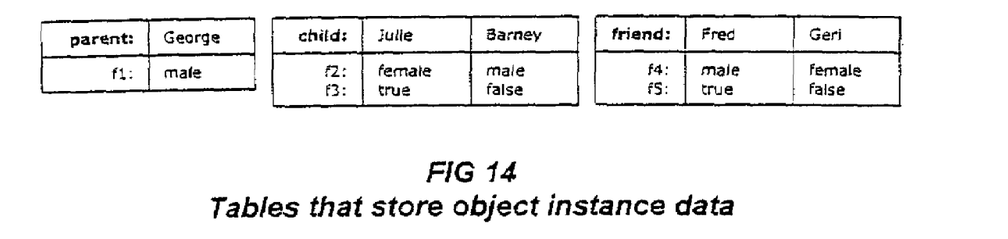

Linear inferencing deals with these multiple object instances by extending the way in which working memory is structured. The original flat table of values is only used for storing facts that are not related to any objects. Facts representing object attributes are stored in special object instance tables such as illustrated in FIG. 14.

The Linear inferencing process itself is largely unaffected by these structural changes to working memory. The existence of multiple values for facts does not change the order in which rules need to be inferenced so the process remains linear, as before.

However, the inferencing process is modified when a rule is encountered that proves a fact that appears in multiple object instances, in which case that rule is evaluated once for each instance. In other words, the rule evaluation order is preserved but some rules are evaluated more than once.

Batch Processing

It is normal for expert systems to support some form of batch processing, i.e. the unattended recalculation or reconsideration of a large number of saved cases due to a change in rules.

Batch processing basically involves the following steps:
Load the next case into working memory
Reinference using the new rules
Save the case data out of working memory
Repeat until there are no more cases to process As discussed earlier, the Linear inferencing algorithm is well suited to providing high performance in this type of processing scenario because it is very good at dealing with multiple changes to working memory.

However, a simple extension can provide even better levels of performance by taking advantage of the fact that all inferences involve a single left-to-right sweep of the rulebase. The basic idea is to exploit the highly linear nature of the inferencing process by processing multiple working memories simultaneously for each sweep of the rulebase.

Rulebases can often be very large in size (megabytes) and the process of sweeping the memory occupied by a rulebase is relatively expensive. Spreading the cost of that operation over multiple sessions provides a significant performance boost, especially for large rulebases.

Minimizing Conditional Branches

Modern processors use onboard caches to achieve high levels of performance, which the Linear inferencing algorithm uses to good effect to maximize performance.

Another important strategy employed by modern processors to boost performance is deep instruction pipelining, which involves overlapping the execution of instructions which effectively keeps every part of a processor as busy as possible.

One of the key hazards to instruction pipelining is conditional branching which can cause the pipeline to stall when the processor fails to predict the next instruction to execute. To facilitate maximum processor performance, the frequency of unpredictable conditional branches is minimized.

The main area where the avoidance of conditional branching can pay large performance dividends is rule evaluation. To this end, implementation of Linear inferencing has largely reduced the process of evaluating rules to a sequence of logical operations and table lookups. An example of this preferred approach applied to the specific problem of performing a logical AND on a set of Boolean fact values is as follows:

1. Represent each fact value as a bit mask:

| Value | Binary mask (decimal equivalent) |
| --- | --- |
| true | 100 (4) |
| false | 010 (2) |
| unknown | 001 (1) |

2. Combine the fact values using a bitwise OR operation and use it to lookup the result:

| Binary index (decimal equivalent) | Result |
| --- | --- |
| 000 (0) | true |
| 001 (1) | unknown |
| 010 (2) | false |
| 011 (3) | false |
| 100 (4) | true |
| 101 (5) | unknown |
| 110 (6) | false |
| 111 (7) | false |

It should be noted that his type of approach can also be used with the other logical operators to help remove conditional branching from rule evaluation.

It will be appreciated that the forward-chaining inferencing system and method of the present invention, and which utilizes linear inferencing, has a number of advantages over known forward-chaining inferencing methods. The Rete algorithm has a number of shortcomings including that it only deals with small changes, that it carries a high memory overhead and that it lacks support for modern processor architectures.

With regard to the first of these shortcomings, the Rete algorithm was designed to perform the completely minimum amount of work for each discrete change in input fact value. This is a valid approach, given its key assumption that working memory changes slowly, but this assumption is out of date—inferencing in modern expert systems usually occurs after many changes in input fact values:

Stateless, interactive systems (for supporting high levels of scalability) rely on the efficient reconstruction of an inferred state from a large set of input facts (routinely 100s per transaction)

Even for interactive systems that do not implement statelessness, the transactional nature of modern systems, combined with the capacity and desire to collect multiple items of data from a user at a time, means that inferencing rarely occurs after a single fact changes value Batch processing or engine-based systems are presented with a lump of input facts (routinely 100s per transaction) from which to infer decisions Data sourced from corporate databases is presented to an expert system as a lump of input facts (routinely 100s), when initializing a session The Rete algorithm is not suited to efficiently coping with the routine change of 100s of input facts and yet this is what is required by modern systems.

As to high memory overhead, the Rete algorithm builds complex data structures which mirror the complexity of the rulebase. These data structures can, therefore, get quite large for big and complex rulebases. Essentially the algorithm sacrifices memory efficiency to ensure that the minimum number of operations is conducted during an inference. This is a major disadvantage for high-performance, high-load enterprise applications where memory is at a premium because each active session requires its own Rete network. Finally, the Rete algorithm does not best exploit the large onboard caches of modern processor architectures which provide the potential for massive performance breakthroughs.

The Linear inferencing approach of the present invention improves upon the above shortcomings and deal with multiple, simultaneous updates to input fact values. This means that it can deal with the various processing scenarios listed above and which are standard features of modern enterprise-level expert systems today. Furthermore, because the working memory largely consists of simple tables of values, working memory required for the present invention has been fully minimized. Finally, modern processors achieve high levels of performance by employing large onboard caches with high-speed memory. The success of these caches relies on memory access locality, i.e. the fact that successive memory accesses are located close together. The Linear inferencing algorithm allows the efficient organization of data structures to achieve very high levels of memory access locality thus maximizing the performance of these caches.

It will of course be realized that whilst the above has been given by way of an illustrative example of this invention, all such and other modifications and variations hereto, as would be apparent to persons skilled in the art, are deemed to fall within the broad scope and ambit of this invention as is herein set forth.

The invention claimed is:

1. A method of forward-chaining inferencing in a rulebased system having a rulebase and a set of input facts, wherein new facts are inferred in accordance with variations to the rules or the input facts, the method including:

developing a computerized database containing a fact dependency tree for indicating which facts are used to produce other facts in accordance with respective rules in the rulebase, the rulebase resident in memory;

sequentially ordering the facts in the fact dependency tree to produce a serialized fact dependency tree wherein for any given fact in the sequence, all facts which are used to produce that fact are facts which are earlier in the sequence than is the given fact; and ordering the rules in the rulebase in accordance with the facts produced thereby to produce a serialized rulebase wherein the rules are in the same sequential order as the facts in the serialized fact dependency tree.

2. A method of forward-chaining inferencing as claimed in claim 1, and including:

setting in working memory all known input facts;

sequentially evaluating each of the ordered rules in the rulebase; and updating the working memory in accordance with any changes to the facts in accordance with the evaluating of a rule.

3. A method of forward-chaining inferencing as claimed in claim 1, wherein development of the computerized database containing a fact dependency tree includes:

generating a graph in which each of the facts relevant to the set of rules in the rulebase is identified without any indication of the sequential relationship of the facts; and for each rule in the rulebase, providing an arc between the facts associated with that rule, the linkage being directed from the fact(s) which produce other fact(s) toward the other fact(s).

4. A method of forward-chaining inferencing as claimed in claim 2, wherein only those rules which are relevant in a given situation are evaluated whereby the new facts are inferred incrementally.

5. A method of forward-chaining inferencing as claimed in claim 4, the method including:

maintaining a lookup table for recording for each fact in the rulebase which rules are reliant thereon for evaluation; and maintaining a flag for each rule in the rulebase, the flag indicating, for any given fact or setting of a fact value between or during inferences, whether the rule is relevant or irrelevant.

6. A method of forward-chaining inferencing as claimed in claim 2, and including:

identifying loops in the fact dependency tree, the loops being generated by cyclically dependant rules;

for each said loop, identifying a snarl containing the loop; for each said snarl, ignoring the facts in the snarl and any fact dependencies within the snarl and treating the snarl as an indivisible node, when sequentially ordering the facts in the fact dependency tree; and marking the start and end of each snarl in the serialized rulebase.

7. A method of forward-chaining inferencing as claimed in claim 6, and including: repeatedly evaluating the rules in each snarl in cycles; and stopping evaluating the rules in a snarl when a steady state is reached.

8. A method of forward-chaining inferencing as claimed in claim 2:

wherein facts representing attributes of object instances are stored in working memory object instance tables for storing multiple sets of facts, and wherein the rules proving these facts are evaluated once for each object instance, the sequential evaluation order of the rules being preserved.

9. A method of forward-chaining inferencing as claimed in claim 2, wherein the steps defined in claim 2 are conducted simultaneously across multiple working memories to facilitate batch processing for enhancing the average level of system performance.

10. A computer readable medium having instructions thereon, that when executed causes a processor to implement instructions to create a system for forward-chaining inferencing in a rulebased system having a rulebase and a set of input facts, wherein new facts are inferred in accordance with variations to the rules or the input facts, the computer readable medium including:

instructions to implement a computerized database containing a fact dependency tree for indicating which facts are used to produce other facts in accordance with respective rules in the rulebase, the rulebase resident in memory; and instructions which configure the system to sequentially order the facts in the fact dependency tree to produce a serialized fact dependency tree wherein for any given fact in the sequence, all facts which are used to produce that fact are facts which are earlier in the sequence than is the given fact, and to order the rules in the rulebase in accordance with the facts produced thereby to produce a serialized rulebase wherein the rules are in the same sequential order as the facts they produce in the serialized fact dependency tree.

11. A computer readable medium to implement a system for forward-chaining inferencing as claimed in claim 10, wherein instructions which configure the system to sequentially order the facts, further include:

instructions to set in working memory all known input facts; and instructions to sequentially evaluate each of the ordered rules in the rulebase, and update the working memory in accordance with any changes to the facts in accordance with the evaluating of a rule.

* * * * *